(12) United States Patent  
Diaz

(10) Patent No.: US 12,049,847 B2
(45) Date of Patent: Jul. 30, 2024

(54) GAS TURBINE ENGINE AND HEAT MANAGEMENT SYSTEM FOR COOLING OIL IN AN OIL SYSTEM OF A GAS TURBINE ENGINE

(71) Applicant: Rolls-Royce Deutschland Ltd & Co KG, Blankenfelde-Mahlow (DE)

(72) Inventor: Carlos Enrique Diaz, Garching (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 204 days.

(21) Appl. No.: 17/616,880

(22) PCT Filed: Jun. 10, 2020

(86) PCT No.: PCT/EP2020/066049
§ 371 (c)(1),
(2) Date: Dec. 6, 2021

(87) PCT Pub. No.: WO2020/249599
PCT Pub. Date: Dec. 17, 2020

(65) Prior Publication Data
US 2022/0307417 A1    Sep. 29, 2022

(30) Foreign Application Priority Data

Jun. 14, 2019 (DE) .................. 10 2019 116 240.8

(51) Int. Cl.
*F02C 7/14* (2006.01)
*F01D 25/12* (2006.01)
(Continued)

(52) U.S. Cl.
CPC ............... *F02C 7/14* (2013.01); *F01D 25/12* (2013.01); *F01D 25/14* (2013.01); *F02C 7/22* (2013.01);
(Continued)

(58) Field of Classification Search
CPC .... F02C 7/14; F02C 7/22; F01D 25/12; F01D 25/14; F05D 2240/35; F05D 2260/20; F05D 2260/98
See application file for complete search history.

(56) References Cited

U.S. PATENT DOCUMENTS 2,731,245 A * 1/1956 McChesney ............... F28F 1/12
                                                  165/184
3,756,020 A * 9/1973 Moskowitz ............... F02C 7/14
                                                  415/176

(Continued)

FOREIGN PATENT DOCUMENTS

| EP | 2085599 A2 | 8/2009 |
| EP | 3244039 A1 | 11/2017 |
| GB | 2494058 A | 2/2013 |

OTHER PUBLICATIONS

German Search Report dated Feb. 5, 2020 from counterpart German Patent Application No. 10 2019 116 240.8.

(Continued)

*Primary Examiner* — J. Todd Newton
*Assistant Examiner* — Aye S Hyay
(74) *Attorney, Agent, or Firm* — SHUTTLEWORTH & INGERSOLL, PLC; Timothy J. Klima

(57) ABSTRACT

A gas turbine engine for an aircraft that includes a nacelle, a fan, an engine core, a bypass duct extending between the engine core and the nacelle and guiding a bypass airflow through the bypass duct, and at least one non-structural strut extending in the radial direction within the bypass duct, wherein the non-structural strut includes an outside wall acting as a heat exchanger, and wherein the outside wall includes first transport means configured to transport in the outside wall at least one fluid to be cooled. It is provided that the non-structural strut further includes second transport means configured to transport a fluid to be heated, wherein (Continued)

the first transport means and the second transport means are configured such that the fluid to be heated is heated by the at least one fluid to be cooled and the at least one fluid to be cooled is cooled both by the bypass airflow and the fluid to be heated.

18 Claims, 10 Drawing Sheets

(51) Int. Cl.
    *F01D 25/14*     (2006.01)
    *F02C 7/22*     (2006.01)
(52) U.S. Cl.
    CPC ...... *F05D 2240/35* (2013.01); *F05D 2260/20* (2013.01); *F05D 2260/98* (2013.01)

(56) References Cited

U.S. PATENT DOCUMENTS

| | | | | |
|---|---|---|---|---|
| 3,830,058 | A * | 8/1974 | Ainsworth | F02C 7/20 |
| | | | | 244/54 |
| 4,684,322 | A * | 8/1987 | Clifford | F01D 5/187 |
| | | | | 416/96 A |
| 4,914,904 | A * | 4/1990 | Parnes | F01D 9/065 |
| | | | | 60/39.08 |
| 5,269,133 | A | 12/1993 | Wallace | |
| 7,861,512 | B2 * | 1/2011 | Olver | F02C 7/141 |
| | | | | 60/39.08 |
| 2009/0159246 | A1 * | 6/2009 | Cornet | F28D 9/0093 |
| | | | | 165/138 |
| 2009/0188234 | A1 * | 7/2009 | Suciu | F02K 3/115 |
| | | | | 60/39.83 |
| 2010/0300066 | A1 | 12/2010 | Bulin et al. | |
| 2013/0048243 | A1 * | 2/2013 | Pollard | F28D 1/0246 |
| | | | | 165/185 |
| 2013/0291554 | A1 * | 11/2013 | Marini | F02C 6/08 |
| | | | | 60/785 |
| 2015/0023776 | A1 | 1/2015 | Ribarov et al. | |
| 2017/0159489 | A1 * | 6/2017 | Sennoun | F28D 7/1676 |
| 2017/0336149 | A1 * | 11/2017 | Ribarov | F28F 13/06 |
| 2019/0271267 | A1 * | 9/2019 | Husband | F02C 7/185 |
| 2020/0224975 | A1 * | 7/2020 | Palmer | F28D 9/0093 |
| 2022/0282670 | A1 * | 9/2022 | Niergarth | F02K 3/06 |

OTHER PUBLICATIONS

International Search Report and Written Opinion dated Sep. 3, 2020 from counterpart International Patent Application No. PCT/EP2020/066049.

* cited by examiner

GAS TURBINE ENGINE AND HEAT MANAGEMENT SYSTEM FOR COOLING OIL IN AN OIL SYSTEM OF A GAS TURBINE ENGINE

This application is the National Phase of International Application PCT/EP2020/066049 filed Jun. 10, 2020 which designated the U.S.

This application claims priority to German Patent Application No. DE 10 2019 116 240.8 filed Jun. 14, 2019, which applications are incorporated by reference herein.

The present disclosure relates to a gas turbine engine and a heat management system for cooling oil in an oil system of a gas turbine engine.

It is known to cool lube oil and electrical generator oil of a gas turbine engine with colder fuel and/or with colder air. Systems cooling with colder fuel are referred to as fuel cooled oil coolers. Systems cooling with colder air are referred to as air cooled oil coolers.

With respect to systems cooling with colder air, it is known to implement heat exchangers as surface coolers in the bypass duct of the gas turbine engine or to arrange them in outlet guide vanes (OGVs) located downstream of the fan in the bypass duct. Such OGV integrated heat exchangers fulfill a structural function to pass structural loads between the engine core and the nacelle and an aerodynamic function to straighten the flow downstream the fan blades.

Document U.S. Pat. No. 4,914,904 A discloses to integrate a heat exchanger in structural struts located in the bypass channel of a gas turbine engine. Document U.S. Pat. No. 5,269,133 A describes a heat exchanger which extends radially from the core engine into the bypass channel.

Document US 2010/0300066 A1 discloses a turbojet engine in which a heat exchanger is integrated into a lower bifurcation of the turbojet engine arranged downstream of a fan straightener in the bypass channel of the turbojet engine.

The problem underlying the present invention is to provide for a gas turbine engine and heat management system which cool a fluid to be cooled in an effective manner.

This problem is solved by a gas turbine engine and a heat management system with features as disclosed herein. Embodiments of the invention are identified in the present disclosure.

According to a first aspect of the invention, a gas turbine engine for an aircraft is considered that comprises a nacelle, a fan, an engine core comprising a primary duct guiding a core airflow through the engine core, and a bypass duct extending between the engine core and the nacelle and guiding a bypass airflow through the bypass duct. There is provided at least one non-structural strut extending in the radial direction within the bypass duct, wherein the non-structural strut comprises an outside wall acting as a heat exchanger. The outside wall includes first transport means configured to transport in the outside wall at least one fluid to be cooled.

It is provided that the non-structural strut further comprises second transport means configured to transport a fluid to be heated, wherein the first transport means and the second transport means are configured such that the fluid to be heated is heated by the at least one fluid to be cooled and the at least one fluid to be cooled is cooled both by the bypass airflow and the fluid to be heated. This implies that, before entering the non-structural strut, the temperature of the fluid to be heated is lower than the temperature of the fluid to be cooled.

Aspects of the invention are thus based on the idea to implement a heat exchanger in a non-structural strut, the conventional function of which is to provide for a sheltered and aerodynamic passageway for fluid pipes and cables that radially extend through the bypass duct to provide and exchange fluid and electricity between components located in the nacelle and components located in the core engine. A heat exchanging function is added to the transport/shielding function of the non-structural strut.

Further, for a synergistic effect is provided for in that benefits both for the fluid to be cooled and the fluid to be heated are provided. The fluid to be cooled is cooled in an effective manner as it is cooled by both the bypass airflow and the fluid to be heated. The fluid to be heated is heated by the fluid to be cooled without any need for providing additional heating means.

In addition, by integrating the transport means for transporting the fluid into the outside wall, an efficient heat transfer with the bypass airflow which passes the outside wall is provided. At the same time, pipes that in conventional non-structural struts are running through the interior of the non-structural strut can be reduced in number, thereby decreasing the required width of the non-structural strut, which results in increased aerodynamic efficiency of the propulsion system.

A non-structural strut is also referred to as splitter, splitter fairing or fan duct bifurcation.

According to an embodiment, the first transport means are implemented by transport channels which are configured to transport the at least one fluid to be cooled. The first transport channels are integrated into the outside wall of the non-structural strut. In embodiments, the transport channels have been created in the outside wall by extrusion or by an additive manufacturing method such as 3D printing.

In an embodiment, the outside wall in which the first transport channels are integrated consists of aluminum. Aluminum is associated with the advantage that it is a lightweight material into which channels can be implemented by extrusion or additive manufacturing. The outside wall has a thickness that, in an embodiment, is in the range between 4 mm and 10 mm, in particular in the range between 6 mm and 8 mm. The thickness of the wall is typically constant. Such thickness allows to implement transport channels within the wall without endangering the structural stability of the wall.

In other embodiments, the outside wall in which the transport channels are integrated can be manufactured using a thermally conductive composite or a thermally conductive polymer.

According to an aspect of the invention, the first transport channels comprise transport channels that are part of an oil system and configured to transport oil to be cooled. Cooling of oil is one implementation of the present invention. However, the present invention is not limited to a particular fluid and may be used to implement the cooling of any fluid transported in the non-structural strut.

In an embodiment, the second transport means for transporting the fluid to be heated are also integrated as second transport channels into the outside wall, such that the outside wall comprises first channels in which the fluid to be cooled is transported and second channels in which the fluid to be heated is transported. The fluid to be cooled is cooled in an effective manner by both the bypass airflow and the fluid to be heated.

Alternatively, the second transport channels may be provided in a separate structure of the non-structural strut that, e.g., is attached (for example from the inside) to the outer wall such that a heat transfer between the fluid in the first transport channels and the fluid in second transport channels can take place.

According to one embodiment, the second transport channels configured to transport the fluid to be heated are arranged in the outside wall to the inside of the transport channels configured to transport the fluid to be cooled. Accordingly, the first transport channels transporting the fluid to be cooled are closer to the outside surface of the outside wall such that there is an efficient heat transfer between the fluid to be cooled and the bypass airflow. On the other hand, the second transport channels transporting the fluid to be heated are located closer to the inside surface of the outer wall such that they are not cooled by the bypass airflow but instead heated by the fluid to be cooled.

In an example, the fluid to be cooled is oil from a lube oil system of the gas turbine engine and the fluid to be heated is fuel that is provided from the aircraft through the nacelle to a combustor of the core engine. The fuel that comes from the aircraft is relatively cold and should be warmed before provided to the combustor.

According to a further embodiment, the second transport channels configured to transport the fluid to be heated are arranged in the outside wall essentially perpendicular to the first transport channels configured to transport the fluid to be cooled. Accordingly, the respective transport channels cross each other at right angles. However, the present invention is not limited to such embodiments. In other embodiments, the first transport channels and the second transport channels cross at an angle different than 90 degrees or run parallel to each other. If running parallel to each other, the respective fluids may run in the same direction or in opposite directions in the respective transport channels.

In a further embodiment, the non-structural strut also comprises an inside compartment surrounded by the outside wall, wherein the inside compartment comprises at least one of electrical lines, air ducts and drain pipes. Accordingly, pipes and ducts which are not integrated into the outer wall of the non-structural strut pass the bypass duct in the sheltered compartment surrounded by the outside wall. The inside compartment may be a single compartment or consist of several departments separated by walls.

According to an embodiment, the outside wall comprises two opposite walls spaced apart in the circumferential direction and extending in the axial direction, wherein at least the first transport channels extend in both walls. The two opposite walls may together form a nose of the non-structural strut which is designed in a streamlined manner at the upstream end of the non-structural strut. Generally, the non-structural strut comprises a smooth outline to reduce aerodynamic drag.

According to an embodiment, at least the first transport channels (and possibly also the second transport channels) extend to the leading edge of the outside wall. This means that, if transport channels run mainly in the radial direction, some of the transport channels are located at and near the leading edge. This further means that, if transport channels run mainly in the axial direction, at least some of the transport channels extend to the leading edge. Such embodiments are associated with the advantage of efficient cooling as the leading edge of the non-structural strut and the neighboring areas are particularly exposed to the gas streaming in the bypass duct.

In an aspect of the invention, the non-structural strut is configured as a cross flow heat exchanger. For example, the first transport channels extend radially in each of the opposite walls, wherein the fluid to be cooled is moved radially inward in the transport channels of one of the opposite walls and subsequently moved radially outward in the transport channels of the other opposite wall, or vice versa. A similar arrangement may be provided for the second transport channels.

In another aspect of the invention, the non-structural strut is configured as a partial counter flow and partial parallel flow heat exchanger. For example, the first transport channels extend axially in each of the opposite walls, wherein the fluid to be cooled is moved axially forward in the transport channels of one of the opposite walls and moved axially rearward in the transport channels of the other opposite wall. A similar arrangement may be provided for the second transport channels.

In another aspect of the invention, the non-structural strut is configured as a full counter flow heat exchanger or full parallel flow heat exchanger. For example, the first transport channels extend axially in each of the opposite walls, wherein the fluid to be cooled is moved axially forward in the transport channels of both opposite walls. A similar arrangement may be provided for the second transport channels.

According to an embodiment, the first transport channels integrated into the outside wall additionally comprise cooling fins. Such cooling fins are associated with the advantage that additional heat can be transferred from the fluid in the transport channels to the outside wall of the non-structural strut and from that wall to the bypass airflow and the fluid to be heated. The cooling fins can be implemented in a plurality of ways. Any structure that increases the contact area between the outside wall and the fluid transported in the transport channels can serve as a fin. In an embodiment, the cooling fins are implemented as walls that extend along the length of the transport channels and are pointing towards the inside of the transport channels.

The transport channels may have any cross-sectional form. Embodiments implement a cross section that is circular, elliptical or rectangular.

Typically, the at least one non-structural strut is located downstream of the outlet guide vanes in the bypass duct. The non-structural strut is a different element of the gas turbine engine than the outlet guide vanes. The purpose of the non-structural strut is to provide aerodynamic shielding to ducts and cables for electricity through the bypass duct, wherein aspects of the present invention provide for the further effect of a heat transfer between at least one fluid transported in the non-structural strut and the bypass airflow. Different than a structural outlet guide vane, a non-structural strut does not deflect the passing air and does not carry any structural loads between the nacelle and the engine core.

In embodiments, there are arranged between one and three non-structural struts in the bypass duct at the same axial position. They may be located in the bypass duct at even circumferential distance. The non-structural strut or one of the non-structural struts may be located at the 6 o'clock position of the aircraft engine or out of the 6 o'clock position.

According to a further aspect a fluid inlet to the non-structural strut and a fluid outlet from the non-structural strut are both located at the radial outer side or the radial inner side of the non-structural strut, i.e., they are both located either at the nacelle side or the engine core side in this embodiment. Accordingly, if the inlet and the outlet are located at the nacelle side of the non-structural strut, the fluid enters the non-structural strut from the nacelle and returns to the nacelle without passing the engine core. Similarly, if the inlet and the outlet are located at the engine core side of the non-structural strut, the fluid enters the non-structural strut from the engine core and returns to the engine core without passing the nacelle. These embodiments may particularly regard the inlet and outlet of the fluid to be cooled.

In other embodiments, the inlet and the outlet are located at different ends of the non-structural strut, i.e., the fluid can pass between the engine core and the nacelle. This may particularly be the case for the inlet and outlet of the fluid to be heated.

According to a further aspect of the invention, the least one non-structural strut further comprises third transport means in the outside wall of the non-structural strut which are configured to transport a further fluid to be cooled. For example, the further fluid may be oil of a further oil circuit or may be a cooling fluid of the gearbox of a geared turbofan engine. It may be provided that the input to and the output from the third transport channels are arranged both at the radial outer side of the non-structural strut. At the same time, it may be provided that the input to and the output from the first transport channels are arranged both at the radial inner side of the non-structural strut. This way, both fluids to be cooled enter the non-structural strut and return to where they come from.

According to a further aspect of the invention, a heat management system for cooling oil in an oil system of a gas turbine engine having an engine core and a bypass duct is provided. The heat management system comprises a lube oil circuit of an oil system of the gas turbine engine and a fuel line providing fuel to a combustor of gas turbine engine. A non-structural strut is provided that extends in the radial direction within the bypass duct, wherein the non-structural strut comprises an outside wall into which first transport channels and second transport channels are integrated. The outside wall forms a heat exchanger. It is further provided that the first transport channels are configured to transport lube oil of the lube oil circuit and that the second transport channels are configured to transport fuel of the fuel line. The first and second transport channels are configured such that the fuel is heated by the lube oil in the first transport channels and that the lube oil is cooled both by the bypass airflow and the fuel in the second transport channels.

This further aspect of the invention is associated with the advantage that a heat transfer between the oil, the fuel and the bypass airflow is implemented in an effective and integrated manner in a non-structural strut.

According to an embodiment, the input and the output of the first transport channels are both arranged at the radial inner side of the non-structural strut, i.e., the oil of the oil system is provided from the core engine and returned to the core engine without passing through elements in the nacelle. Likewise, if the gearbox is located in the nacelle fan compartment, the oil could be provided from the nacelle and returned to the nacelle without passing through elements in the core engine.

According to a further embodiment, there is further provided an oil circuit of an electrical generator providing electrical energy to the aircraft. Such generator is also referred to as IDG, "Integrated Drive Generator". The further IDG oil circuit passes third transport channels in the outside wall of the non-structural strut, wherein the oil of the further oil circuit is also cooled by the bypass airflow and/or the fluid to be heated. The input and the output of the third transport channels may be arranged both at the radial outer side of the non-structural strut. Accordingly, in such embodiment, the oil of the IDG oil circuit is provided from the nacelle and returns to the nacelle without passing the core engine. In case the IDG is located in the core compartment of the nacelle, the oil of the IDG oil circuit may be provided from the core engine and returned to the core engine without passing the nacelle.

According to an embodiment of the present invention, the gas turbine engine is a geared fan gas turbine engine in which the fan is driven via a gearbox. The cooling fluid used to cool such fan gearbox can also be cooled in the integrated heat exchanger that constitutes the nonstructural strut. To this end, e.g., a further cooling circuit may be provided that passes transport channels in the outside wall of the non-structural strut. The cooling fluid may be oil used to lubricate the fan gearbox or may be another cooling fluid.

It should be noted that the present invention is described in terms of a cylindrical coordinate system having the coordinates x, r and φ. Here x indicates the axial direction, r the radial direction and φ the angle in the circumferential direction. The axial direction is defined by the machine axis of the gas turbine engine in which the present invention is implemented, with the axial direction pointing from the engine inlet to the engine outlet. Starting from the x-axis, the radial direction points radially outwards. Terms such as "in front of" and "behind" refer to the axial direction or flow direction in the engine. Terms such as "outer" or "inner" refer to the radial direction.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being Jkg−1K−1/(ms−1)2). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The invention will be explained in more detail on the basis of exemplary embodiments with reference to the accompanying drawings in which.

Figure 6:
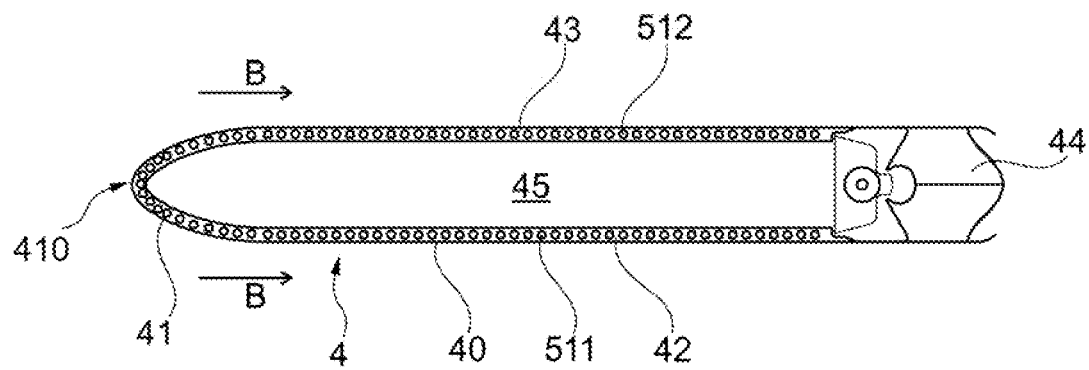
FIG. 6 is a cross-sectional view of an embodiment of a non-structural strut, the strut comprising two opposite walls and transport channels integrated into the walls.
Figure 7:
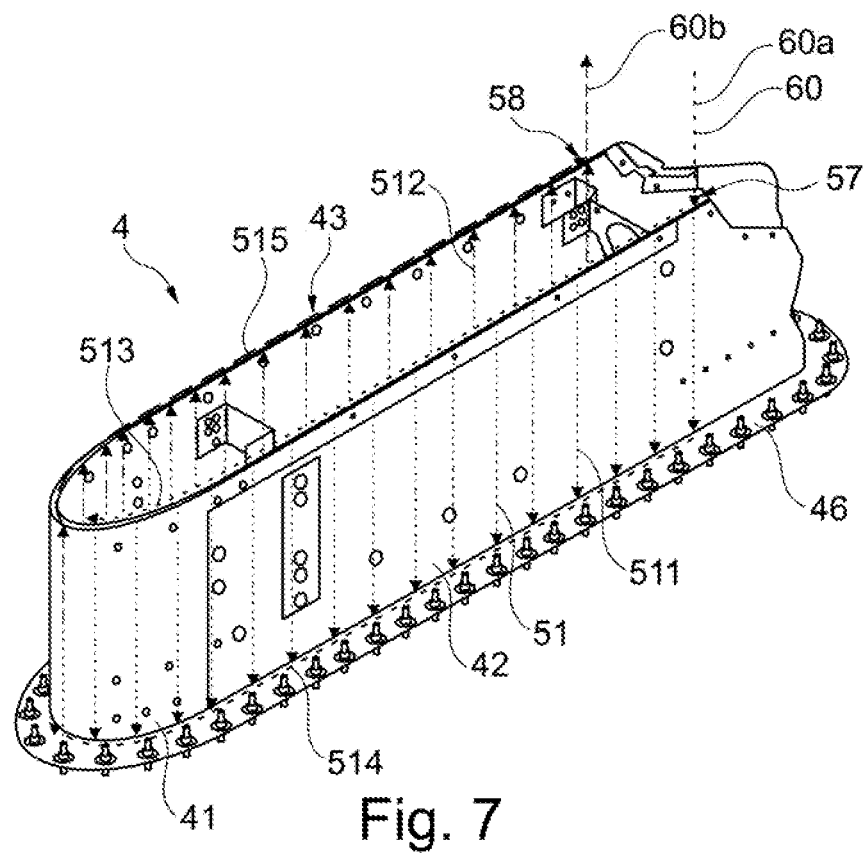
Figure 8:
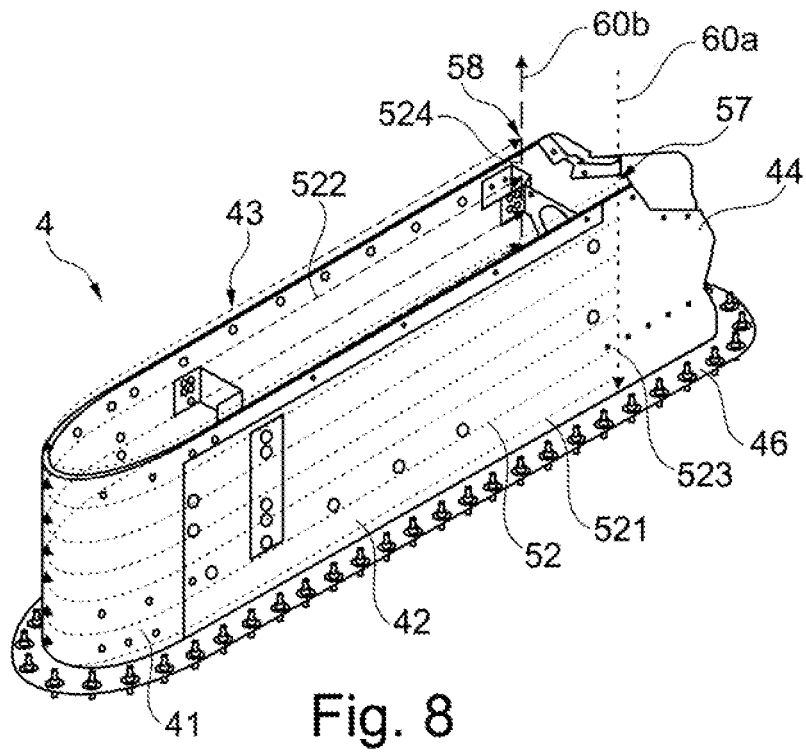
Figure 9:
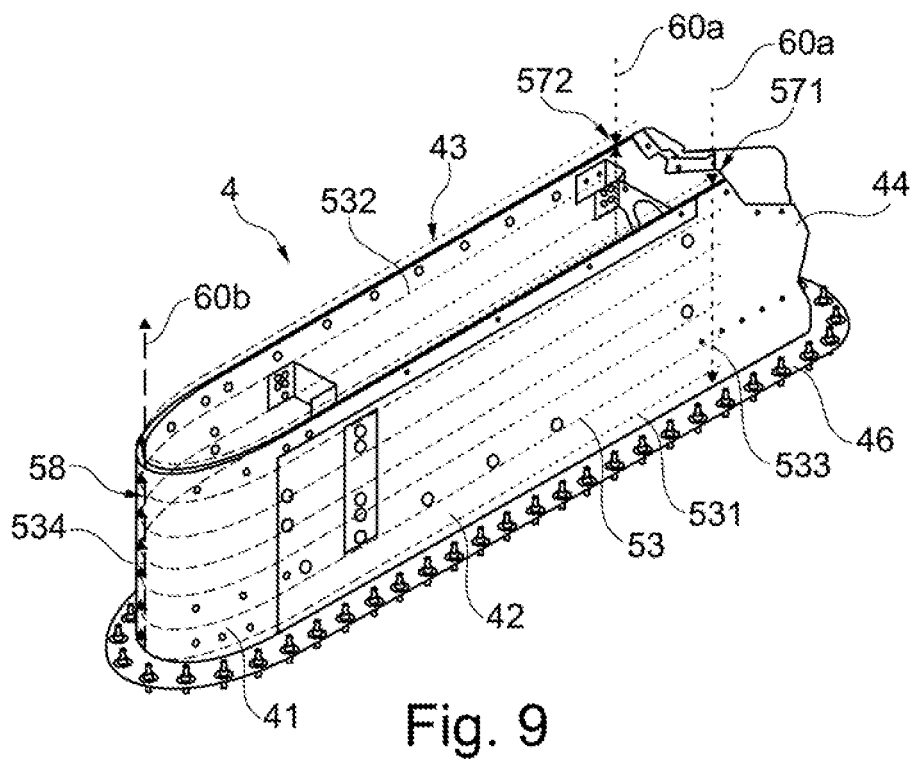
Figure 10:
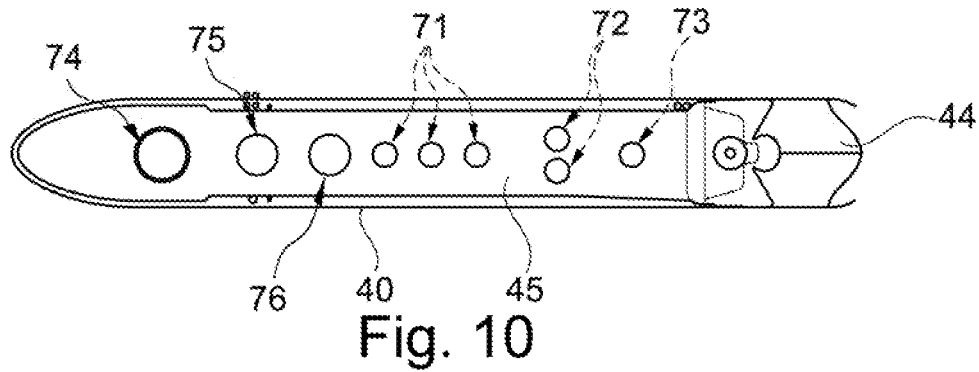
Figure 11:
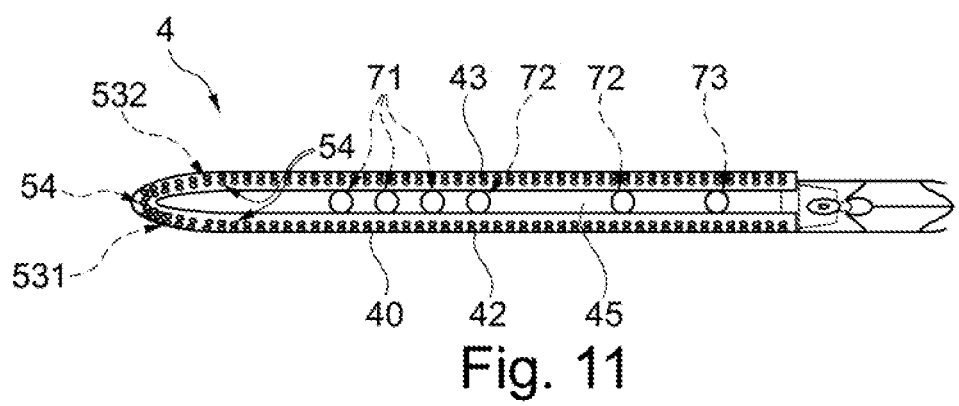
Figure 12:
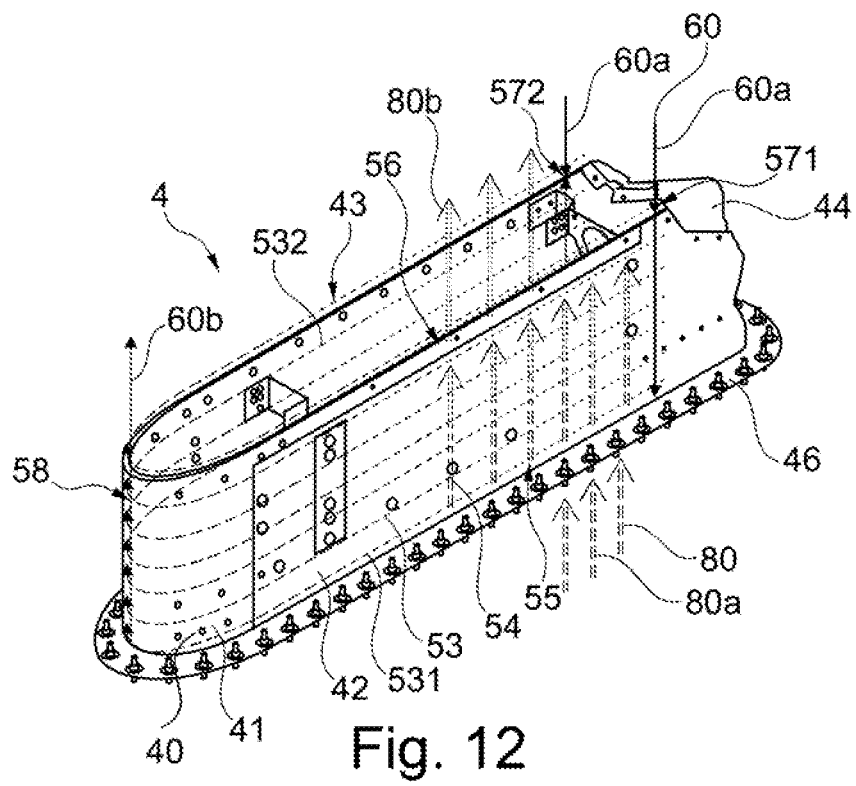
Figure 13:
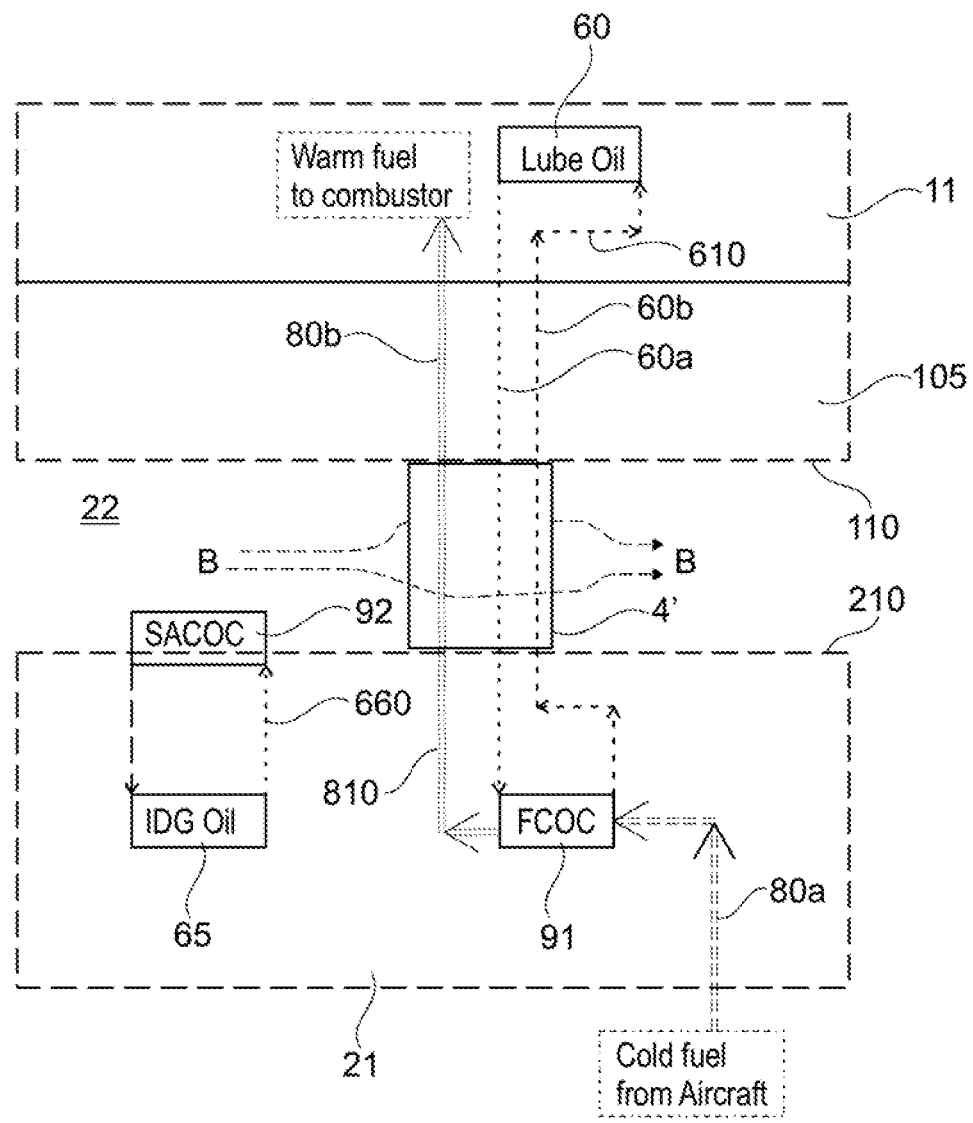
Figure 14:
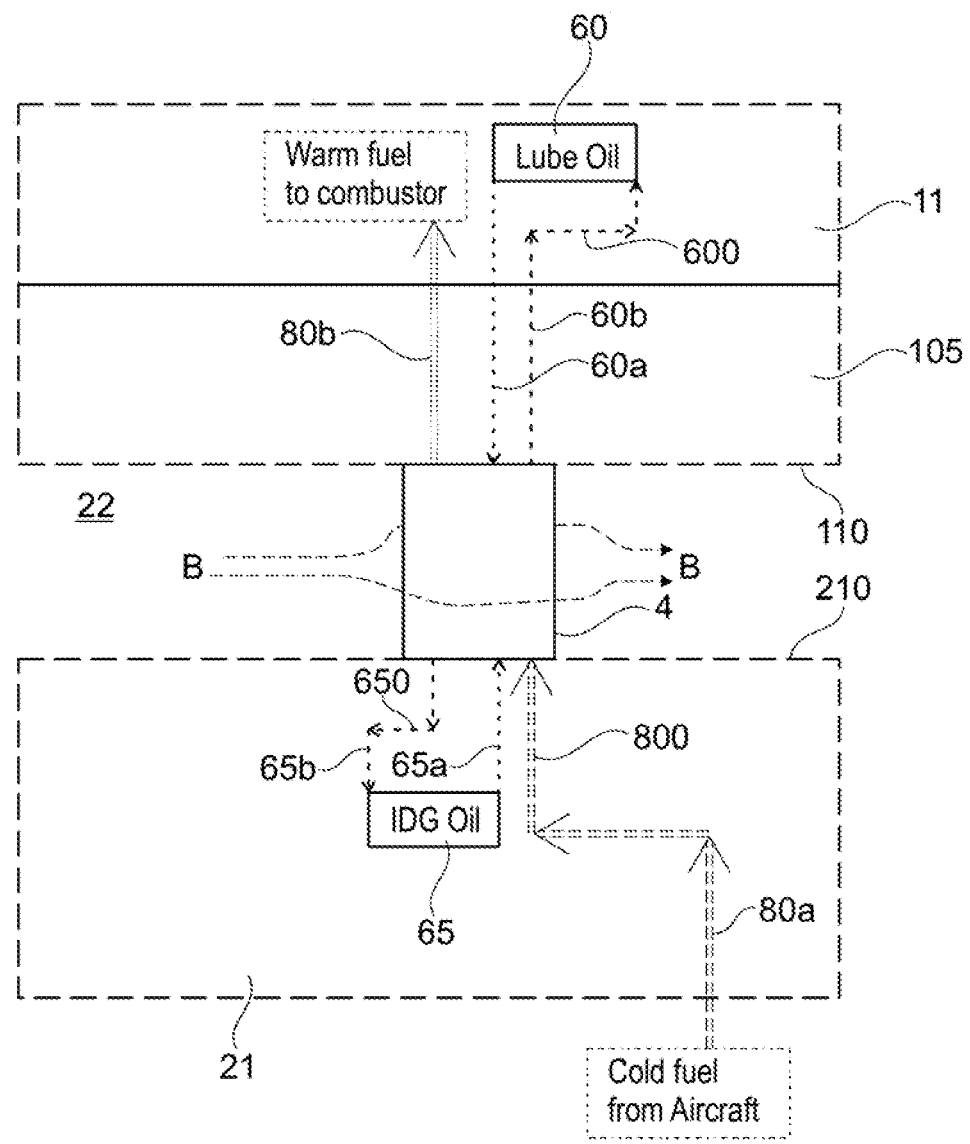
Figure 15:
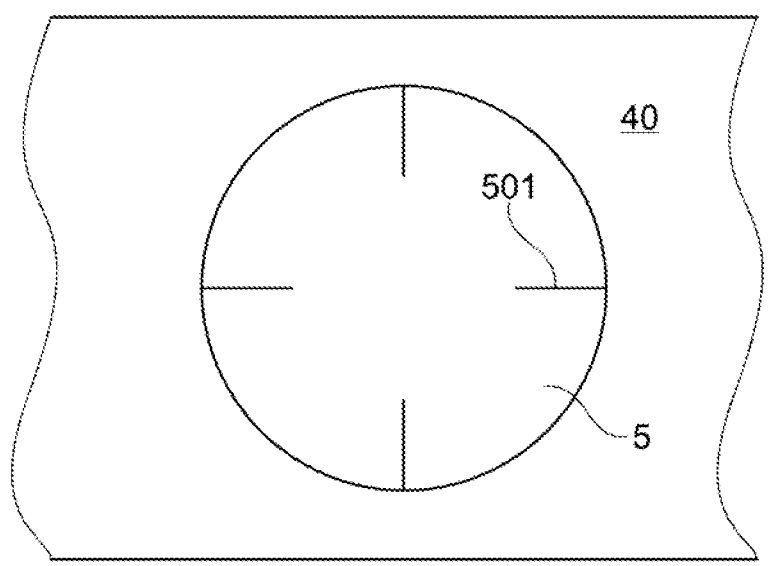

FIG. 7 a three-dimensional view of an embodiment of a non-structural strut similar to the embodiment of FIG. 6, wherein transport channels are integrated into opposite walls of the strut, and wherein the transport channels implement a cross flow heat exchanger;

FIG. 8 a three-dimensional view of a further embodiment of a non-structural strut, wherein transport channels are integrated into opposite walls of the strut, and wherein the transport channels implement a partial counter flow and partial parallel flow heat exchanger;

FIG. 9 a three-dimensional view of a further embodiment of a non-structural strut, wherein transport channels are integrated into opposite walls of the strut, and wherein the transport channels implement a full counter flow heat exchanger;

FIG. 10 a sectional view of an example non-structural strut according to the state of the art;

FIG. 11 a sectional view of a further embodiment of a non-structural strut, wherein transport channels for cooling oil and transport channels for heating fuel are both integrated into the non-structural strut;

FIG. 12 a three-dimensional view of an embodiment according to FIG. 11;

FIG. 13 a heat management system for cooling air in an oil system of a gas turbine engine according to the state of the art;

FIG. 14 an embodiment of a heat management system for cooling air in and oil system of a gas turbine engine; and FIG. 15 a cross-sectional view of an embodiment of a transport channel integrated in the outside wall of a non-structural strut.

Figure 1:
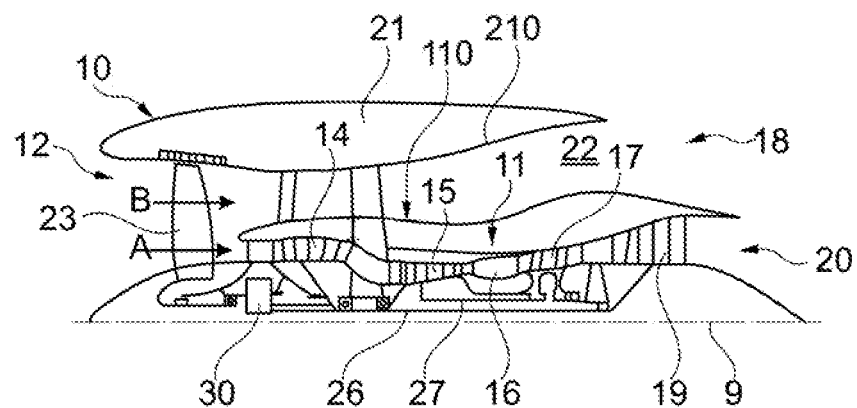
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclical gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclical gearbox 30 is a reduction gearbox.

Figure 2:
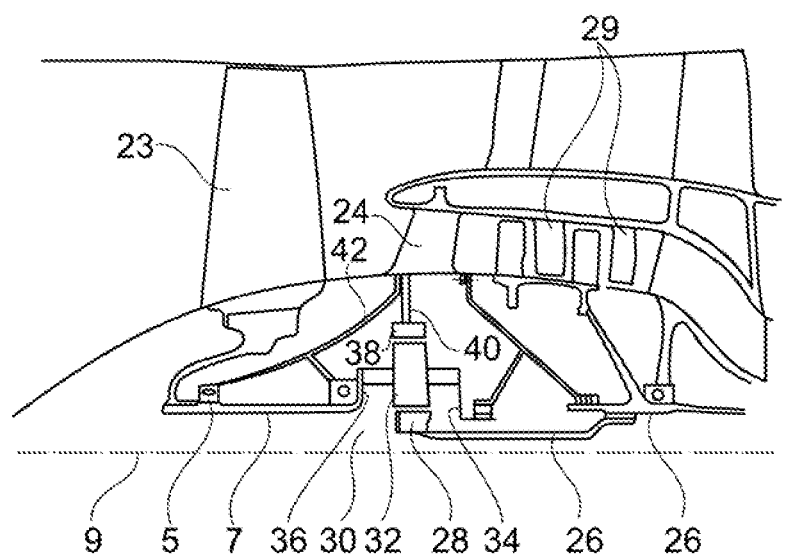
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclical gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
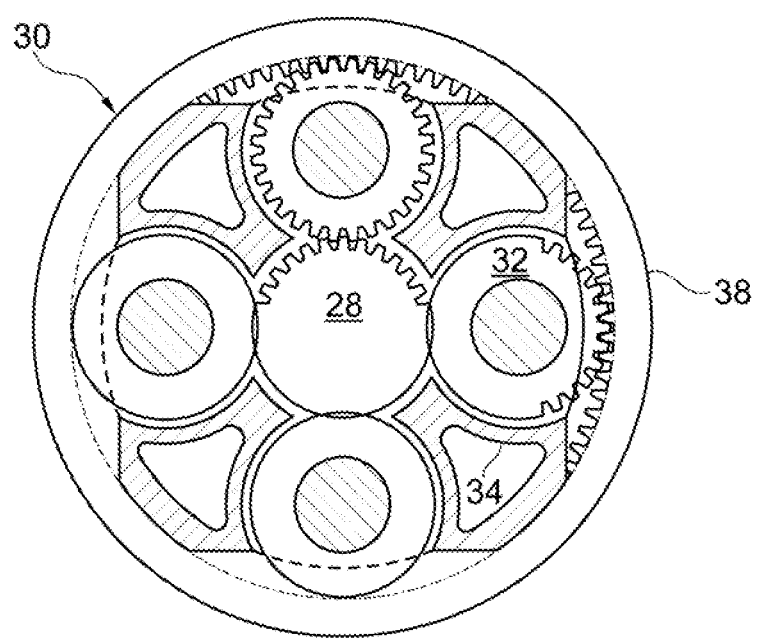
FIG. 3 is a partially cut-away view of a gearbox for a gas turbine engine.

The epicyclical gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclical gearbox 30 generally comprise at least three planet gears 32.

The epicyclical gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclical gearbox 30 may be used. By way of further example, the epicyclical gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

It is further pointed out that, in FIG. 1, the engine core 11 comprises a casing with an outer wall 110 which forms the radially inner boundary of the bypass duct 22. The radially outer boundary of the bypass duct 22 is formed by the inner wall 210 of the nacelle 21.

In the context of the present invention the provision and design of a non-structural strut located in the bypass duct is of relevance.

Figure 4:
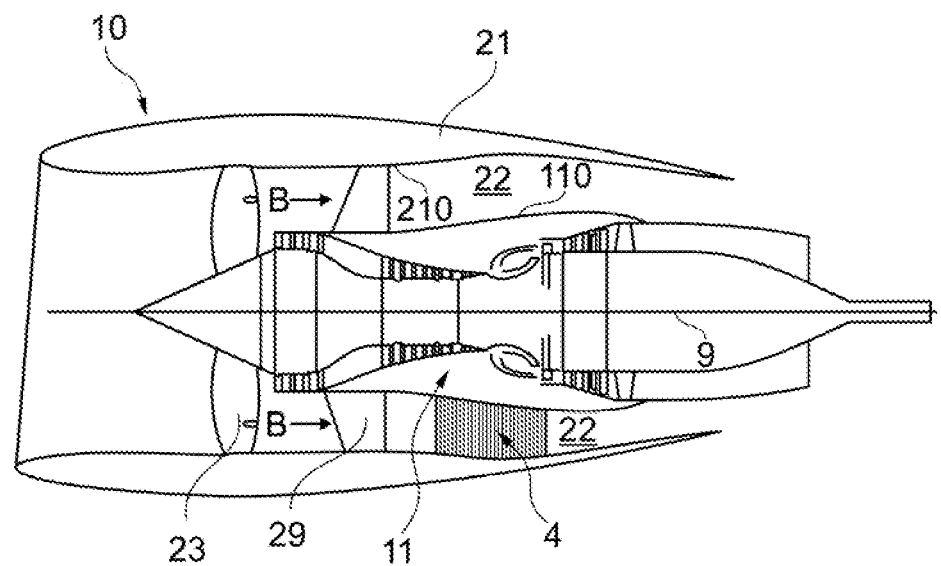
FIG. 4 is a sectional view of a gas turbine engine which shows a typical location of a non-structural strut in the bypass duct of the gas turbine engine.

Such non-structural strut 4 is shown in FIG. 4 which is a further embodiment of a gas turbine engine 10 that comprises a fan 23, a nacelle 21, a core engine 11 and a bypass duct 22. Located in the bypass duct 22 is an outlet guide vane 29. The outlet guide vane 29 takes the swirl out of the air coming from the fan 23, as is known to the skilled person. In addition, the outlet guide vane 29 has the structural function of transmitting loads between the nacelle 21 and the core engine 11.

Downstream of the fan 23 and downstream of the outlet guide vane 29 a non-structural strut 4 is located in the bypass duct 22. Around the circumference of the bypass duct 22, in a typical embodiment, there may be located one to three such non-structural struts 4 in the bypass duct 22. In an embodiment, the axial length of the non-structural strut 4 lies in the range between 30% and 90% of the total axial length of the bypass duct 22 that extends downstream of the outlet guide vane 29.

The non-structural strut 4 does not have any structural function. It serves as a aerodynamic and foreign objects protection and passageway for pipes and cables that need to cross the bypass duct 22. Also, the non-structural strut 4 is not designed to redirect the direction of the bypass airflow B in the bypass duct 22.

Figure 5:
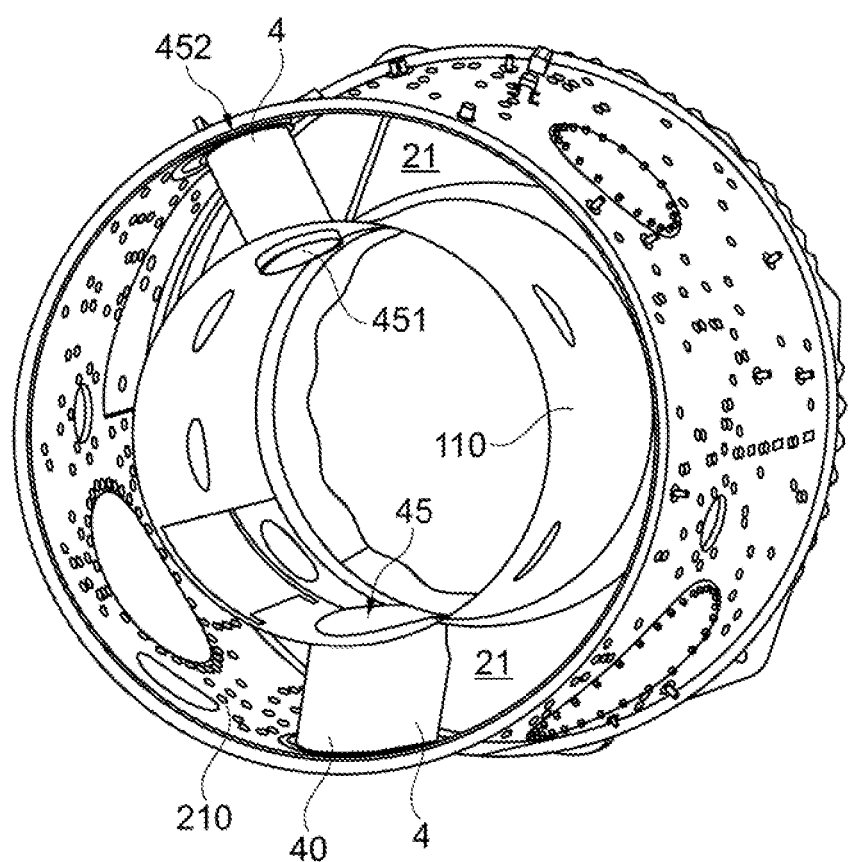
FIG. 5 is a perspective, three-dimensional view of a section of a gas turbine engine which includes a core engine casing outer wall, a nacelle inner wall and non-structural struts extending in the bypass duct between the core engine casing outer wall and the nacelle inner wall.

FIG. 5 shows a section of a gas turbine engine. The depicted section includes the outer wall 110 of an engine core cowl or casing and the inner wall 210 of the nacelle. Between the outer wall 110 and the inner wall 210 extends the bypass duct 22. Two non-structural struts 4 extend radially in the bypass duct 21 between the inner wall 110 and the outer wall 210. Each strut 4 comprises an outside wall 40 and an inside compartment 45, as will be further explained with respect to FIGS. 6 to 12. The inside compartment 45 has an opening 451 to the inner wall 110 and an opening 452 to the outer wall 210 such that cables and pipes can pass the inside compartment 45 between the nacelle and the engine core.

FIG. 6 depicts a cross-sectional view of an embodiment of a non-structural strut 4. The strut 4 comprises an outside wall 40 which surrounds and defines an inside compartment 45. The outside wall 40 consists of several wall sections, namely, two opposite walls 42, 43 that are spaced apart in the circumferential direction and extend in the axial direction. At the forward end of the outside wall 40, the opposite walls 42, 43 join together to form a nose section 41 that comprises a leading edge 410. At the rearward end, the inside compartment 45 is closed by an element 44 that extends between extensions of the parallel walls 42, 43.

Transport channels 511, 512 are integrated into the outside wall 40. The transport channels 511, 512 may for example be created by extrusion or by 3D printing. In one embodiment, the outside wall 40 is made in aluminum with a thickness of about 4 to 10 mm, in particular 6 to 8 mm. In the channels 511, 512 a fluid is transported, wherein the fluid may be moved in opposite directions in walls 42 and 43. The direction of the fluid flowing in channels 511, 512 is in the radial direction and thus at right angles to the direction of the bypass airflow B such that a crossflow heat exchanger is realized. A heat exchange takes place in that the fluid flowing in transport channels 511, 512 transfers its heat to the respective wall 42, 43, wherein the walls 42, 43 are cooled by the bypass airflow B in the bypass duct. In an embodiment, the fluid flowing in transport channels 511, 512 is oil of an oil system.

The transport channels 511, 512 may extend all the way to the leading edge 410 of the outside wall 40. Further, they may extend all along the axial length of the walls 42, 43 up to the closing element 44.

FIG. 7 is a three-dimensional view of a non-structural strut 4 in accordance with FIG. 6. The strut outside walls 41, 42, 43 implement a system of integrated transport channels 51 most of which run in the radial direction. In particular, a fluid 60 is provided to an inlet 57. When in a hot state, the fluid 60 is referred to with reference numeral 60a. When in a cool state, the fluid 60 is referred to with reference numeral 60b. From inlet 57, the fluid 60a is transported via transport channels 513, 511, 514, 512 and 515 to an outlet 58 from which cooled fluid 60b is taken. Channels 513, 514 and 515 are feed channels that feed the transport channels 511 in wall 42 and the transport channels 512 in wall 43.

The fluid 60 is cooled in wall 42 towards the bottom and in wall 43 towards the top (the terms "bottom" and "top" referring to the orientation shown in FIG. 7).

It is to be noted that both the inlet 57 and the outlet 58 of the strut 4 are at the same radial end of the strut 4, i.e., the fluid 60 enters the strut 4 and exits the strut 4 from the same component such as inner wall 110 or outer wall 210 of FIG. 5. In other embodiments, the inlet 57 and the outlet 58 are located at opposing radial ends of the strut.

As shown in FIG. 7, the strut 4 includes a flange-like structure 46 that serves to attach the strut 4 to an adjacent structure such as wall 110 or wall 210 of FIG. 5.

FIG. 8 shows a further embodiment of a non-structural strut 4. The general design of the strut 4 is the same as in FIG. 7 except for the orientation of the transport channels. In the embodiment of FIG. 8, transport channels 52 are provided most of which run in the axial direction. More particularly, in wall 42, transport channels 521 extend axially, wherein the fluid 60a is transported axially forward in the transport channels 521 towards the nose section 41. In opposite wall 43, transport channels 522 also extend axially, wherein the fluid 60b is transported axially rearwards towards outlet 58. Accordingly, the transport channels 52 realize a partial counter flow and partial parallel flow heat exchanger. Along wall 42, a counter flow heat exchanger is realized. Along wall 43, a parallel flow heat exchanger is realized.

Feed channels 523, 524 serve to distribute the fluid to and from the axially extending transport channels 521, 522.

Similar as in the embodiment of FIG. 7, both the inlet 57 and the outlet 58 of the strut 4 are located at the same radial end of the strut 4. A mixed configuration between the design shown in FIG. 7 and FIG. 8 is also possible.

FIG. 9 depicts a further embodiment of a non-structural strut for that implements a heat exchanger. In this embodiment, a full counter flow heat exchanger is realized. In the embodiment of FIG. 9, transport channels 53 are provided most of which run in the axial direction. More particularly, in wall 42, transport channels 531 are provided that extend axially, wherein the fluid 60a is transported axially forward towards the nose section 41. In a similar manner, in opposite wall 43, transport channels 532 are provided that extend axially, wherein the fluid 60a is transported also axially forward towards the nose section 41. To this end, two inlets 571, 572 are provided. In outlet 58 is provided at the nose tip of strut 4. Feed channels 533, 534 serve to distribute the fluid to and from the axially extending transport channels 531, 532.

FIG. 10 shows a state of the art non-structural strut having an outside wall 40 and an inside compartment 45. The inside compartment 45 hosts a plurality of pipes and cables, namely, electric wires 71, air ducts 72, drain lines 73, a pipe for fuel 74, a pipe for hot oil 75 and a pipe for cool oil 76. All pipes and cables run as separate entities through the inside compartment 45 of the non-structural strut.

FIG. 11 depicts an embodiment of the present invention. The inside compartment 45 still covers and hosts electric wires 71, air ducts 72 and drain lines 73. However, the fuel pipe and the oil pipes have disappeared from the inside compartment 45. Instead, they are integrated in the outside wall 40. In particular, there are provided first transport channels 531, 532 that transport oil to be cooled (or more generally a first fluid), and second transport channels 54 that transport fuel to be heated (or more generally a second fluid).

The transport channels 54 that transport fuel to be heated are arranged in the outside wall 40 towards the inside, i.e., towards the inside compartment 45, wherein the transport channels 531, 532 that transport oil to be cooled are arranged in the outside wall 40 towards the outside. This ensures that the oil is cooled by the bypass airflow, while the fuel running in the transport channels 54 is heated by the oil. The heat management system associated with this embodiment will be further explained with respect to FIG. 14.

While FIG. 11 shows transport channels 531, 532 for transporting a first fluid and transport channels 54 for transporting a second fluid that run in the radial direction, the relative location of transport channels can be the same if the transport channels 531, 532 and/or the transport channels 54 run in the axial direction or in an angled direction, which can be the case in other embodiments of the invention. Accordingly, also in such other embodiments the transport channels that transport a fluid to be heated may be arranged in outside wall 40 to the inside of the transport channels that transport the fluid to be cooled while the transport channels that transport a fluid to be cooled may be arranged in the outside wall 40 to the outside of the transport channels that transport the fluid to be heated.

It is pointed out that, although specific arrangements of the first transport channels 531, 532 that transport oil to be cooled and the second transport channels 54 that transport fuel to be heated as described above may be beneficial to improve the heat transfer between the respective channels, some heat transfer will always take place simply by the fact the both first and second transport channels are integrated into the outside wall 40 such that heat is transferred through the outside wall 40 from the hotter fluid to the colder fluid.

When comparing the non-structural struts of FIGS. 10 and 11, it is obvious that the thickness of the non-structural strut 4 can be reduced when less pipes are to be arranged in the inside compartment 45 by transferring the conduction of fluid to transport channels integrated into the strut outside wall 40.

FIG. 12 is a three-dimensional view of the embodiment of FIG. 11. The transport channels 531, 532 for transporting oil 60 are similar to those of FIG. 9, such that the same reference numerals are used as with respect to FIG. 9 and reference is made to FIG. 9 in this respect. Alternatively, the transport channels for transporting oil may be arranged in accordance with the embodiments of FIG. 7 or 8. As can be seen in FIG. 12, the direction of flow in transport channels 54 that transport fuel 80 is perpendicular to the direction of flow in transport channels 531, 532 that transport oil 60. However, this may be different in other embodiments. When in a cold state, the fuel 80 is referred to with reference numeral 80a. When in a hotter state, the fuel 80 is referred to with reference numeral 80b.

In walls 42, 43 fuel inlets 55 and fuel outlets 56 are provided for the fuel to enter and exit the transport channels 54.

The non-structural strut 4 of FIGS. 11 and 12 implements a heat exchanger that provides for a cooling of oil 60 in that the oil 60 is cooled both by the bypass airflow and by transferring heat to the fuel 80a. At the same time, the fuel 80a is heated when passing the non-structural strut 4 and exits the non-structural strut 4 as heated fuel 80b.

The heat management system implemented in a non-structural strut 4 as shown in FIGS. 11 and 12 will be further explained with respect to FIG. 14. However, before explaining the heat management system of FIG. 14, a conventional heat management system is described with respect to FIG. 13 to better explain the differences and advantages of the inventive heat management system.

The heat management system of FIG. 13 manages the heat of two oil circuits 610, 660 and of a fuel line 810. The first oil circuit 610 regards a lube oil circuit of an oil system of the gas turbine engine. The second oil circuit 660 regards an oil circuit of an electric generator, also referred to as IDG (Integrated Drive Generator). In a schematic manner, a gas turbine engine structure similar to that of FIGS. 4 and 5 is depicted in which the heat management system is realized. A bypass duct 22 is realized between an inner wall 110 of a cowl 105 of an engine core 11 and an outer wall 210 of a nacelle 21. Within the bypass duct 22, a bypass airflow B passes a non-structural strut 4' which crosses in the radial direction the bypass duct 22.

For cooling oil of the first oil circuit 610, heated lube oil 60a from the engine core 11 is transported through non-structural strut 4' to a heat exchanger 91 located in the nacelle 21. After having been cooled in heat exchanger 91, the cooled oil 60b is returned through non-structural strut 4' to the core engine 11. The heat exchanger 91 further serves to heat cold fuel 80a coming from the aircraft. After having been heated, the warm fuel 80b is transported through non-structural strut 4' to a combustor of the engine core 11. For cooling oil of the second oil circuit 660, a separate surface cooler 92 is arranged at wall 210 of bypass duct 22.

This state of the art arrangement of a heat management system is associated with the disadvantage that two separate heat exchangers 91, 92 are required. Further, the surface cooler 92 negatively affects the airflow in the bypass channel 22.

FIG. 14 shows the heat management system according to an embodiment of the present invention. The heat management system comprises a lube oil circuit 600, an electric generator oil circuit 650 and a fuel line 800 providing fuel to a combustor. Both heat exchangers 91, 92 of FIG. 13 have been integrated into the non-structural strut 4.

For cooling oil of the lube oil circuit 600, heated lube oil 60a is cooled in transport channels integrated into the outside wall of the non-structural strut 4 as discussed with respect to FIGS. 6 to 12. In this respect, it is pointed out that the input to and the output from the non-structural strut 4 with respect to the lube oil circuit 600 may both be arranged at the radial inner side, such that the lube oil to be cooled does not pass into the nacelle 21.

The fuel line 800 consists of a line that transports cold fuel 80a from the aircraft to the non-structural strut 4 and a line that transports warm fuel 80b into a combustor of the engine core 11. The fuel is heated in the non-structural strut 4 by the lube oil 60 of the lube oil circuit 600 and the electric generator oil circuit 650. Such heat exchange may take place using a non-structural strut 4 as depicted and discussed with respect to FIGS. 11 and 12. Accordingly, the fuel 80 is heated by the lube oil 60 and the lube oil 60 is cooled both by the bypass airflow B and the fuel 80. The fuel 80 is also heated by the electric generator oil 65a and the electrical generator oil 65a is cooled both by the bypass airflow B and the fuel 80.

For cooling oil of the electric generator oil circuit 650, heated oil 65a is cooled in further transport channels integrated into the outside wall of the non-structural strut 4. The cooled oil is returned as oil 65b to the generator. Such further transport channels are not shown in the embodiment of FIGS. 11 and 12 but may be implemented in a similar manner as the oil transport channels depicted and explained with respect to FIGS. 6 to 10. The oil of the electrical generator circuit 650 may also be cooled by the fuel 80.

It is pointed out that the input to and the output from the non-structural strut 4 with respect to the electric generator oil circuit 650 may both be arranged at the radial outer side, such that the oil to be cooled does not pass into the nacelle core 11.

The heat management system of FIG. 14 only uses the heat exchanger implemented in the non-structural strut 4 for cooling the oil in oil circuits 600, 650 and for heating the fuel in fuel line 800 in a simultaneous and integrated manner.

In a further embodiment, instead of or in addition to the electric generator oil circuit 650 there is provided a cooling fluid circuit of a gearbox of a geared turbofan engine, wherein the cooling fluid is cooled in a similar manner as the oil of electric generator oil circuit 650.

FIG. 15 shows schematically an embodiment in which cooling fins 501 that extend towards the inside of a transport channel 5 are integrated into the transport channel 5. The transport channel 5 is integrated into the outside wall 40 of a non-structural strut, as discussed with respect to FIGS. 6 to 12. By implementing cooling fins 501, the heat transfer from the fluid to the wall 40 can be improved. The number and kind of cooling fins 501 depicted in FIG. 15 is exemplary only. Specifically, fractal geometries that mimic the respiratory and vascular systems of plants and animals are implemented in embodiments. Cooling fins or other generic heat transfer enhance mechanisms can be integrated into the transport channels in all of the embodiments discussed above.

It should be understood that the above description is intended for illustrative purposes only, and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. A gas turbine engine for an aircraft comprising:
a nacelle;
a fan;
an engine core located downstream of the fan, the engine core comprising a primary duct guiding a core airflow through the engine core;
a bypass duct located downstream of the fan, the bypass duct extending between the engine core and the nacelle and guiding a bypass airflow through the bypass duct; and
a non-structural strut extending in a radial direction within the bypass duct;
wherein the non-structural strut comprises an outside wall acting as a heat exchanger;
wherein the outside wall includes a first transport device configured to transport in the outside wall a fluid to be cooled,
wherein the non-structural strut further comprises a second transport device configured to transport a fluid to be heated, wherein the first transport device and the second transport device are configured such that the fluid to be heated is heated by the fluid to be cooled and the fluid to be cooled is cooled both by the bypass airflow and the fluid to be heated;
wherein the first transport device includes first transport channels integrated into the outside wall of the non-structural strut, the first transport channels configured to transport the fluid to be cooled;
wherein the second transport device includes second transport channels integrated into the outside wall, the second transport channels configured to transport the fluid to be heated;
wherein the second transport channels are arranged in the outside wall to an inside of the first transport channels.

2. The gas turbine engine of claim 1, wherein the outside wall of the non-structural strut includes aluminum or a metallic light alloy or a thermally conductive composite or polymer.

3. The gas turbine engine of claim 2, wherein the outside wall has a thickness in a range between 4 mm and 10 mm.

4. The gas turbine engine of claim 1, wherein at least some of the first transport channels are part of an oil system and configured to transport oil to be cooled.

5. The gas turbine engine of claim 1, wherein the second transport channels are arranged in the outside wall perpendicular to the first transport channels.

6. The gas turbine engine of claim 1, wherein the non-structural strut comprises an inside compartment surrounded by the outside wall, wherein the inside compartment comprises at least one chosen from electrical lines, fluid ducts and drain pipes.

7. The gas turbine engine of claim 1, wherein the outside wall comprises two opposite walls spaced apart in a circumferential direction and extending in an axial direction, wherein at least the first transport channels extend in both walls.

8. The gas turbine engine of claim 7, wherein the outside wall forms a leading edge, wherein at least the first transport channels extend to the leading edge of the outside wall.

9. The gas turbine engine of claim 7, wherein the non-structural strut is configured as a cross flow heat exchanger, wherein at least the first transport channels extend radially in each of the opposite walls, wherein the fluid to be cooled is moved radially inward in the first transport channels of one of the opposite walls and subsequently moved radially outward in the first transport channels of the other opposite wall, or vice versa.

10. The gas turbine engine of claim 7, wherein the non-structural strut is configured as a partial counter flow and partial parallel flow heat exchanger, wherein at least the first transport channels extend axially in each of the opposite walls, wherein the fluid to be cooled is moved axially forward in the transport channels of one of the opposite walls and moved axially rearward in the transport channels of the other opposite walls.

11. The gas turbine engine of claim 7, wherein the non-structural strut is configured as a full counter flow heat exchanger, wherein at least the first transport channels extend axially in each of the opposite walls, and wherein the fluid to be cooled is moved axially forward in the first transport channels of both opposite walls.

12. The gas turbine engine of claim 1, wherein at least some of the first transport channels integrated into the outside wall each additionally comprise cooling fins extending towards an inside of the transport channel.

13. The gas turbine engine of claim 1, wherein a fluid inlet to the non-structural strut and a fluid outlet to the non-structural strut are both located at a radial outer side or a radial inner side of the non-structural strut.

14. The gas turbine engine of claim 1, wherein the non-structural strut further comprises a third transport device in the outside wall of the non-structural strut configured to transport a further fluid to be cooled.

15. A heat management system for cooling oil in an oil system of a gas turbine engine having an engine core and a bypass duct, the heat management system comprising:
a lube oil circuit of an oil system of the gas turbine engine,
a fuel line providing fuel to a combustor of gas turbine engine,
a non-structural strut extending in a radial direction within the bypass duct, the non-structural strut comprising an outside wall into which first transport channels and second transport channels are integrated, the outside wall forming a heat exchanger,
wherein the first transport channels are configured to transport lube oil of the lube oil circuit;
wherein the second transport channels are configured to transport fuel of the fuel line,
wherein the first and second transport channels are configured such that the fuel is heated by the lube oil in the first transport channels and that the lube oil is cooled both by a bypass airflow and the fuel in the second transport channels;
wherein the outside wall comprises two opposite walls spaced apart in a circumferential direction and extending in an axial direction, wherein at least the first transport channels extend in both walls;
wherein the non-structural strut is configured as a full counter flow heat exchanger, wherein at least the first transport channels extend axially in each of the opposite walls, and wherein the fluid to be cooled is moved axially forward in the first transport channels of both opposite walls.

16. The heat management system of claim 15, and further comprising an input to and an output from the first transport channels, both arranged at a radial inner side of the non-structural strut.

17. The heat management system of claim 15, and further comprising:
a further fluid circuit of an electrical generator or of a gearbox of a geared turbofan engine,
third transport channels integrated into the outside wall and wherein the third transport channels are configured to transport the fluid of the further fluid circuit, wherein the fluid of the further fluid circuit is cooled by the bypass airflow and/or the fuel to be heated.

18. A gas turbine engine for an aircraft comprising:
a nacelle;
a fan;
an engine core located downstream of the fan, the engine core comprising a primary duct guiding a core airflow through the engine core;
a bypass duct located downstream of the fan, the bypass duct extending between the engine core and the nacelle and guiding a bypass airflow through the bypass duct; and
a non-structural strut extending in a radial direction within the bypass duct;
wherein the non-structural strut comprises an outside wall acting as a heat exchanger;
wherein the outside wall includes a first transport device configured to transport in the outside wall a fluid to be cooled,
wherein the non-structural strut further comprises a second transport device configured to transport a fluid to be heated, wherein the first transport device and the second transport device are configured such that the fluid to be heated is heated by the fluid to be cooled and the fluid to be cooled is cooled both by the bypass airflow and the fluid to be heated;

wherein the outside wall comprises two opposite walls spaced apart in a circumferential direction and extending in an axial direction, wherein at least the first transport channels extend in both walls;

wherein the non-structural strut is configured as a cross flow heat exchanger, wherein at least the first transport channels extend radially in each of the opposite walls, wherein the fluid to be cooled is moved radially inward in the first transport channels of one of the opposite walls and subsequently moved radially outward in the first transport channels of the other opposite wall, or vice versa.

* * * * *